(12) United States Patent
Park et al.

(10) Patent No.: US 8,276,614 B2
(45) Date of Patent: Oct. 2, 2012

(54) SUCTION VALVE OF VARIABLE CAPACITY COMPRESSOR FOR VEHICLE

(75) Inventors: Jang Sik Park, Anseong-si (KR); Ki Yeon Kim, Anseong-si (KR); Jin Sang Kim, Anseong-si (KR)

(73) Assignee: Dong-Il Machinery Co., Ltd., Gyeonggi-Do (KR)

( * ) Notice: Subject to any disclaimer, the term of this patent is extended or adjusted under 35 U.S.C. 154(b) by 163 days.

(21) Appl. No.: 12/827,367

(22) Filed: Jun. 30, 2010

(65) Prior Publication Data

US 2011/0076171 A1    Mar. 31, 2011

(30) Foreign Application Priority Data

Sep. 30, 2009    (KR) .................. 10-2009-0093279

(51) Int. Cl.
  *F16K 17/04*    (2006.01)
(52) U.S. Cl. .................... 137/540; 137/543.21; 137/535
(58) Field of Classification Search .................. 137/535, 137/528, 538, 540, 543.19, 543.21
  See application file for complete search history.

(56) References Cited

U.S. PATENT DOCUMENTS 4,874,066 A * 10/1989 Silberstein .................... 188/280
7,581,560 B2 * 9/2009 Koch et al. ............... 137/543.19

* cited by examiner

*Primary Examiner* — Kevin Lee
*Assistant Examiner* — Macade Brown
(74) *Attorney, Agent, or Firm* — F. Chau & Associates, LLC (57) ABSTRACT

Disclosed is a suction valve of a variable capacity compressor for vehicle including: a valve sheet, a valve case, a spool valve, and a resilient member, wherein the valve case includes a first coolant discharging port and a pair of second coolant discharging ports, each second coolant discharging port being smaller in size than the first coolant discharging port, and wherein the spool valve includes a plurality of first grooves and two pairs of second grooves which are formed on the first grooves so that the second grooves in each pair face each other and a coolant may be introduced from the bottom surface of the valve case, and wherein when the spool valve is initially opened, the coolant is introduced through the first and second grooves.

3 Claims, 13 Drawing Sheets

Fig. 1

<Prior Art>

Fig. 2

<Prior Art>

Fig. 3a

<Prior Art>

Fig. 3b

<Prior Art>

Fig. 4a

<Prior Art>

Fig. 4b

<Prior Art>

Fig. 4c

<Prior Art>

SUCTION VALVE OF VARIABLE CAPACITY COMPRESSOR FOR VEHICLE

This non-provisional application claims priority under 35 U.S.C. §119(a) on Patent Application No. 10-2009-0093279 filed in Republic of Korea on Sep. 30, 2009 the entire contents of which are hereby incorporated by reference.

BACKGROUND

1. Field

The present invention is directed to a valve of a variable capacity compressor for vehicle, and more particularly to a suction valve of a variable capacity compressor for vehicle that may reduce noises created between a valve case and a spool valve.

2. Related Art

In general, a compressor for vehicular air conditioner compresses a coolant gas supplied from an evaporator using a dynamic force and transfers the compressed coolant gas to a condenser. Among the compressors, variable capacity compressors recently gain popularity, which control the inclined angle of a swash plate to change the discharging volume.

Figure 1:
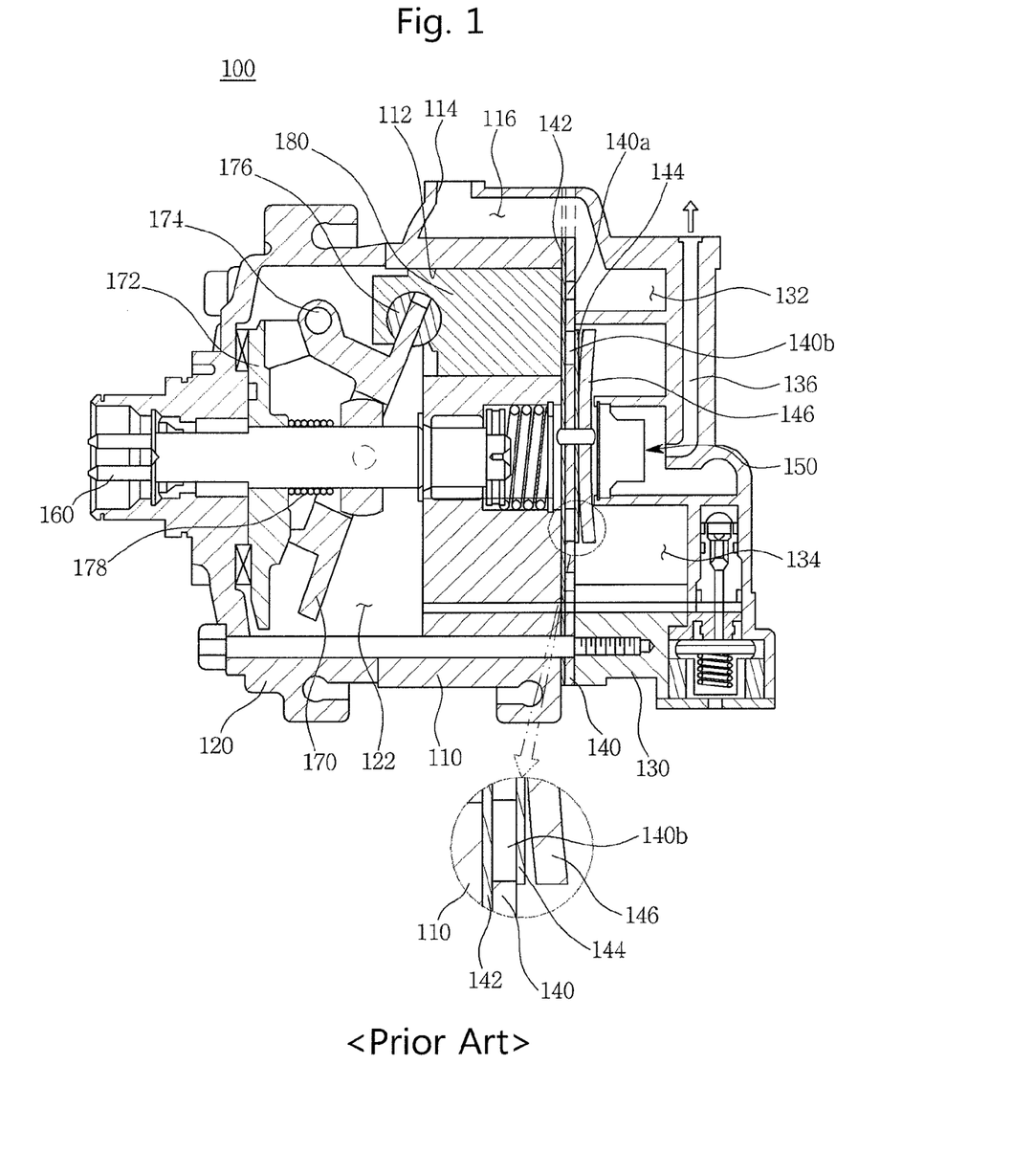
FIG. 1 is a cross section view illustrating a general one-way valve of a variable capacity compressor for vehicle according to the related art.

As shown in FIG. 1, a variable capacity swash plate-type compressor 100 generally includes a cylinder block 110 that includes a plurality of cylinder bores 112, a suction port 114, and a suction muffler chamber 116; a front housing 120 that is coupled with the cylinder block 110 before the cylinder block 110 to form a crank chamber 122; and a rear housing 130 that is located behind the cylinder block 110 and includes a suction chamber 132, a discharging chamber 134, and a discharging path 136.

Figure 2:
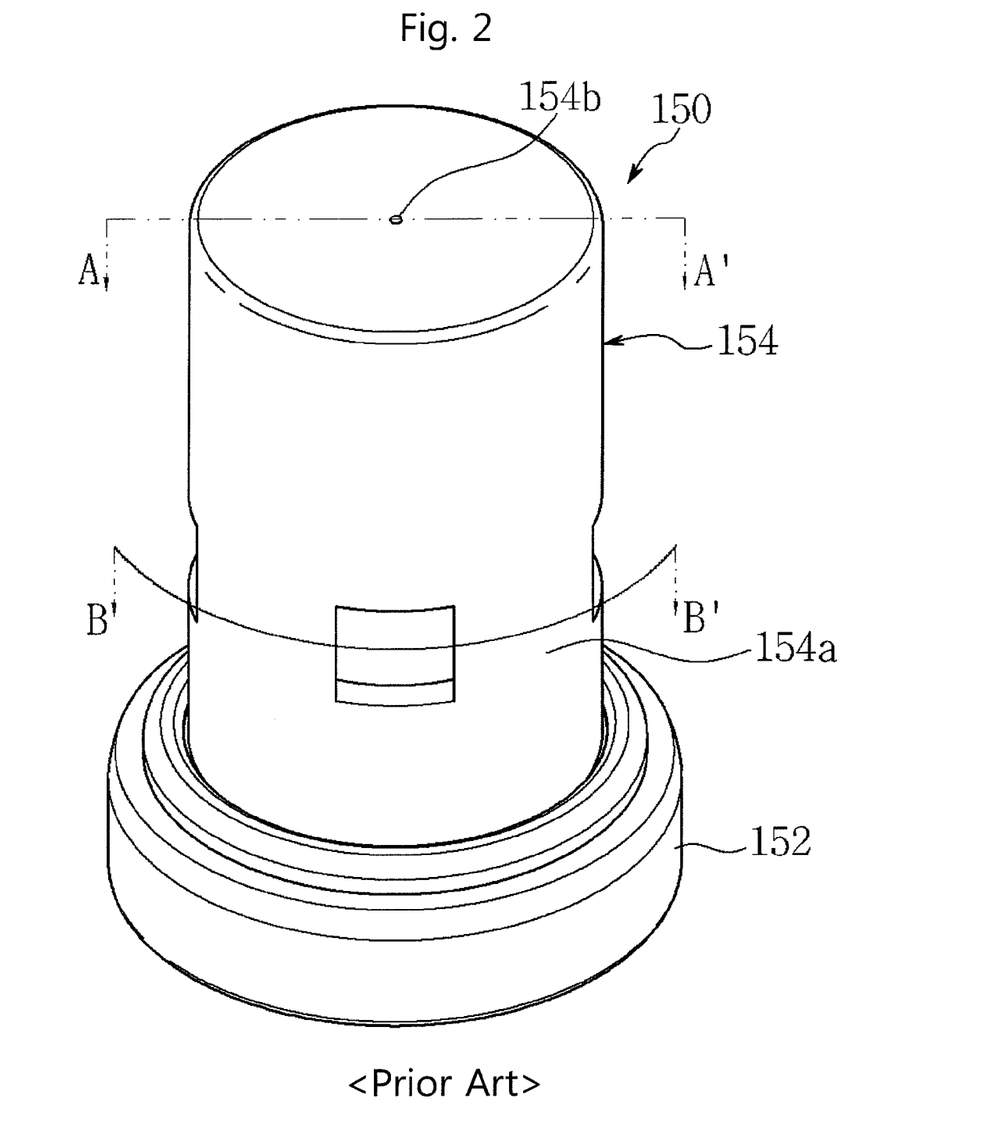
FIG. 2 is a perspective view illustrating a one-way valve of a variable capacity compressor according to the related art.

A valve plate 140 is provided between the front housing 120 and the rear housing 130 and a coolant is introduced and discharged through the valve plate 140. As shown in FIGS. 1 and 2, the valve plate 140 is shaped as a circular plate and includes a plurality of coolant suction openings 140a that are arranged along an outer circular arc and a plurality of coolant discharging openings 140b that are arranged along an inner circular arc. A suction reed valve 142 is positioned in front of the valve plate 140 and a discharging reed valve 144 and a retainer 146 is sequentially positioned behind the valve plate 140. A one-way valve 150 is provided to prevent a coolant from flowing back to the front of the valve plate 140.

The variable capacity swash plate-type compressor 100 further includes a driving shaft 160 rotatably provided at the central portion of the cylinder block 110 and the front housing 120; a swash plate 170 connected to a rotor 172 mounted at the driving shaft 160 through a hinge portion 174 in the crank chamber 122 so that its inclined angle varies with the pressure of the crank chamber 122; and a plurality of pistons 180, each interlocking with the swash plate 170 through a shoe 176 and travelling forth and back in the cylinder bore 112 according to the rotation of the swash plate 170, thus sucking and compressing the coolant. A compression coil spring 178 is provided between the swash plate 170 and the rotor 172 to return the swash plate 170 to the original position.

As the driving shaft 160 and the swash plate 170 are rotated together, the coolant compressed in the cylinder block 110 is discharged to a condenser through the discharging path 136 and the discharged volume of the coolant may be varied by adjusting the inclined angle of the swash plate 170.

Although the swash plate 170 maintains the minimum inclined angle when the air conditioner of the vehicle is turned off, the angle does not become zero degree and thus the coolant is partially discharged from the variable capacity compressor 100 to the condenser even when the air conditioner is turned off. To prevent the coolant from being discharged when the air conditioner is turned off and prevent the discharged coolant from flowing back from the condenser to the variable capacity compressor 100, the one-way valve 150 is provided at the end of the valve plate 140.

Figure 3A:
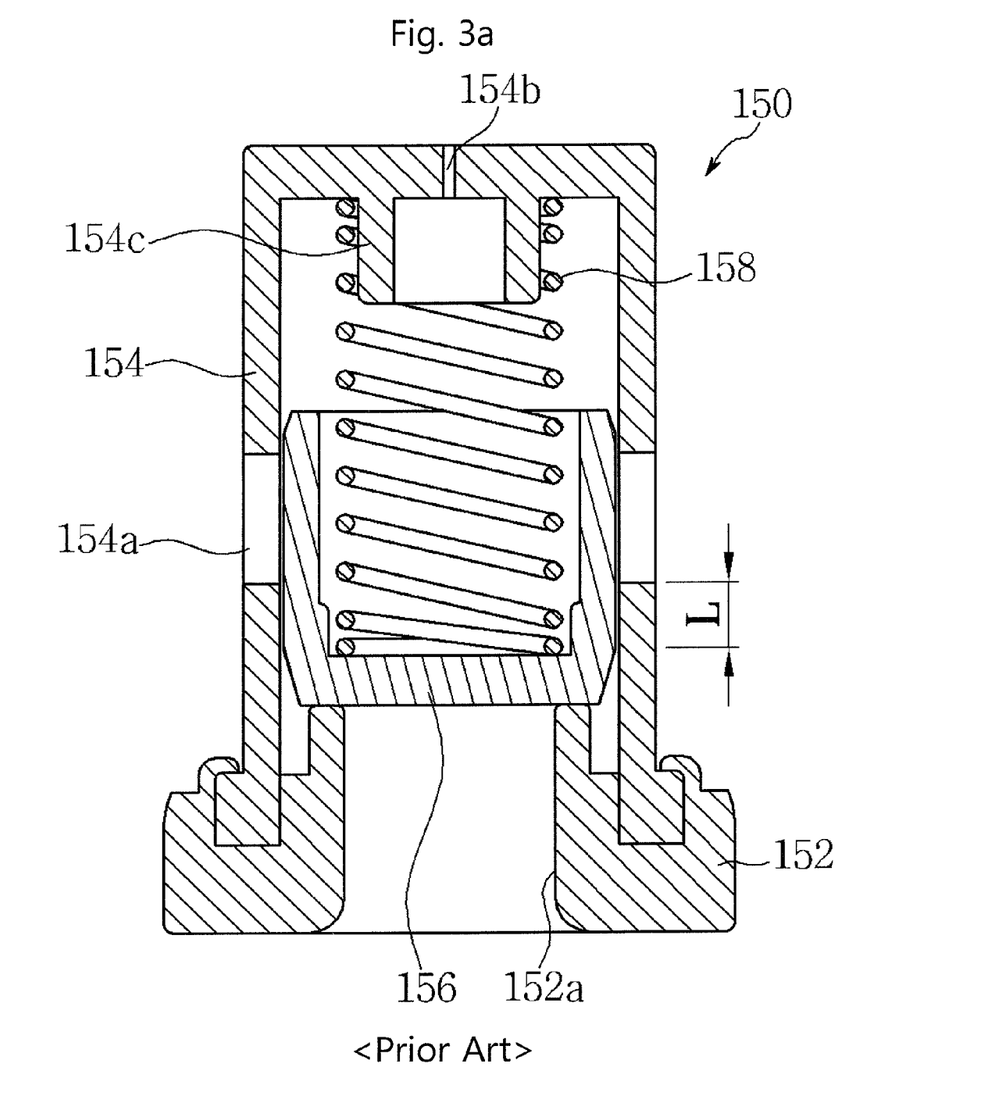
FIGS. 3A and 3B are cross section views taken along lines A-A and B-B, respectively, of FIG. 2.

The conventional one-way valve 150, as shown in FIGS. 2 and 3A, includes a valve sheet 152 having a coolant inlet 152a formed at the center; a valve case 154 provided over the valve sheet 152 and having a plurality of coolant discharging ports 154a along the circumferential surface; a spool valve 156 selectively opening/closing the coolant inlet 152a and the coolant discharging port 154a in the valve case 154; and a resilient member 158 provided between the valve case 154 and the spool valve 156.

Figure 3B:
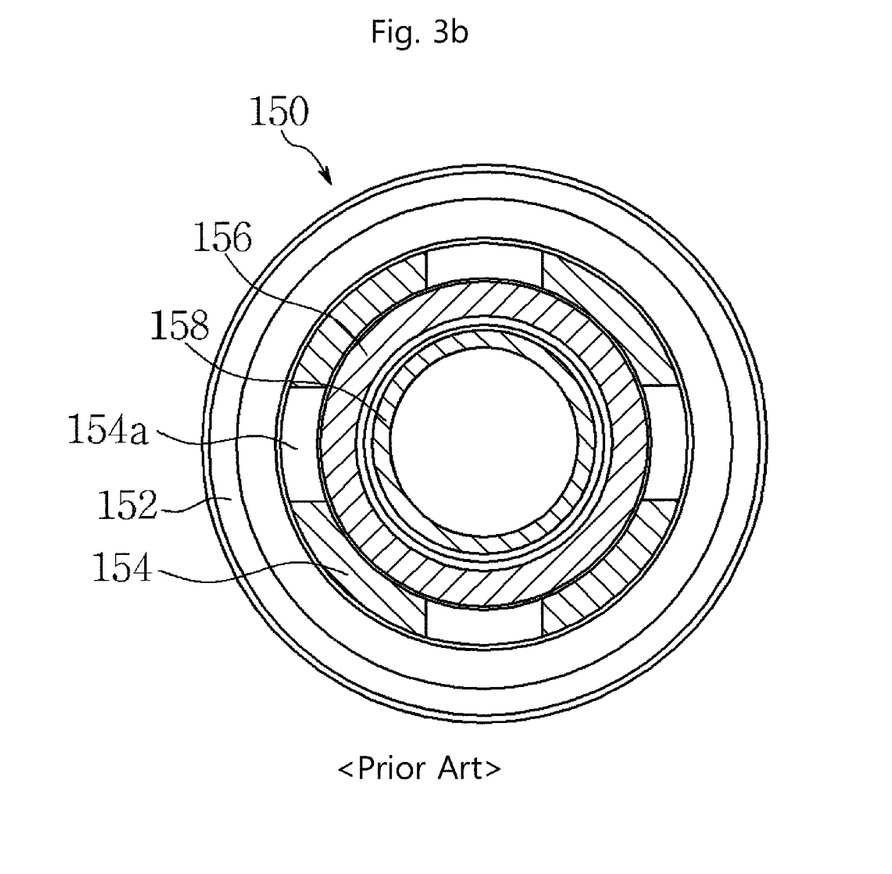

As shown in FIGS. 3A and 3B, the valve case 154 includes four coolant discharging ports 154a, one facing another with respect to the central vertical axis of the valve case 154, and a vent hole 154b at the center of the top surface of the valve case 154 to prevent occurrence of back pressure. The valve case 154 further includes a guide portion 154c that extends downward from the inner surface of the top portion to guide and support the resilient member 158.

The spool valve 156 is shaped as a cylindrical structure whose bottom surface is closed and receives the resilient member 158 therein. The spool valve 156 is lifted up and down by pressure of the coolant in the valve case 154 to selectively open and close the coolant inlet 152a and the coolant discharging port 154a.

In the conventional one-way valve 150, however, initial opening pressure was unstable due to a delay in opening time and leakage of coolant between the valve case 154 and the spool valve 156 when the spool valve 156 rises to initially open the coolant discharging port 154a, thus causing noises in pipes.

Figure 4A:
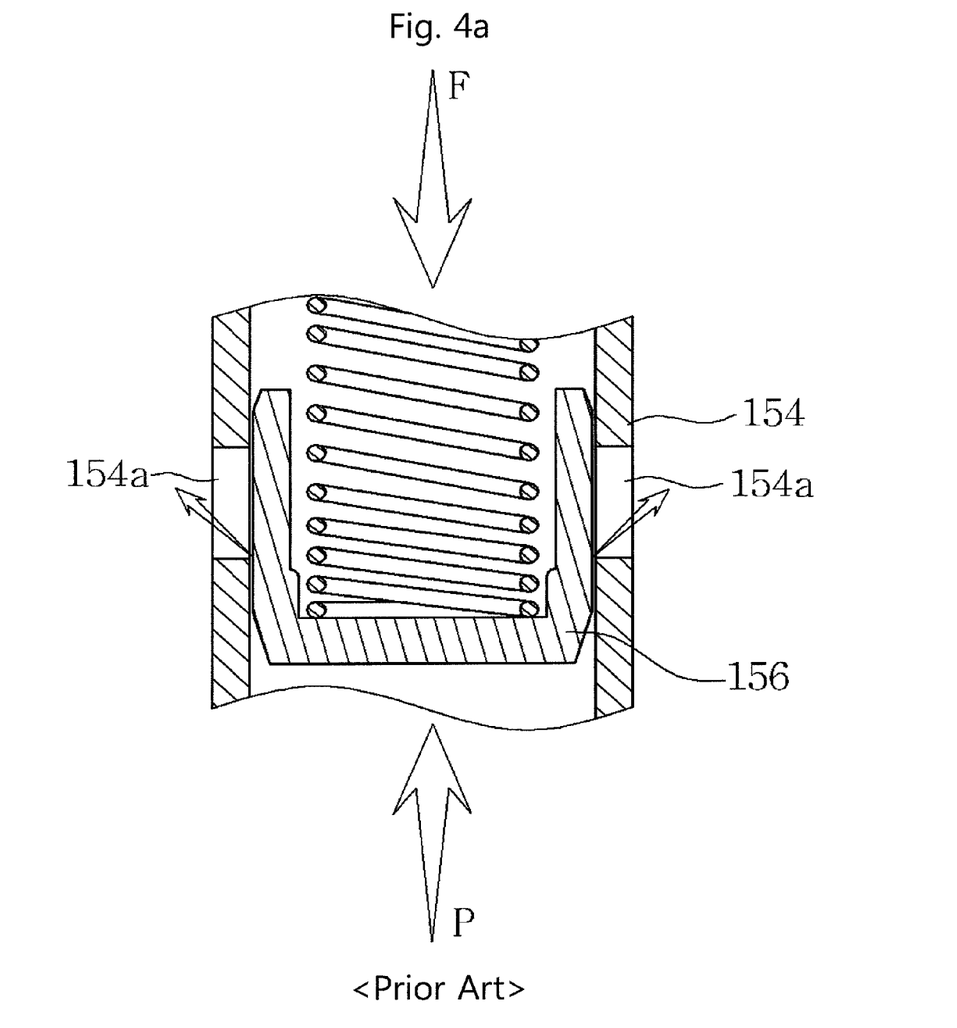
FIGS. 4A to 4C are views illustrating the operation of a spool valve included in a conventional one-way valve.
Figure 4B:
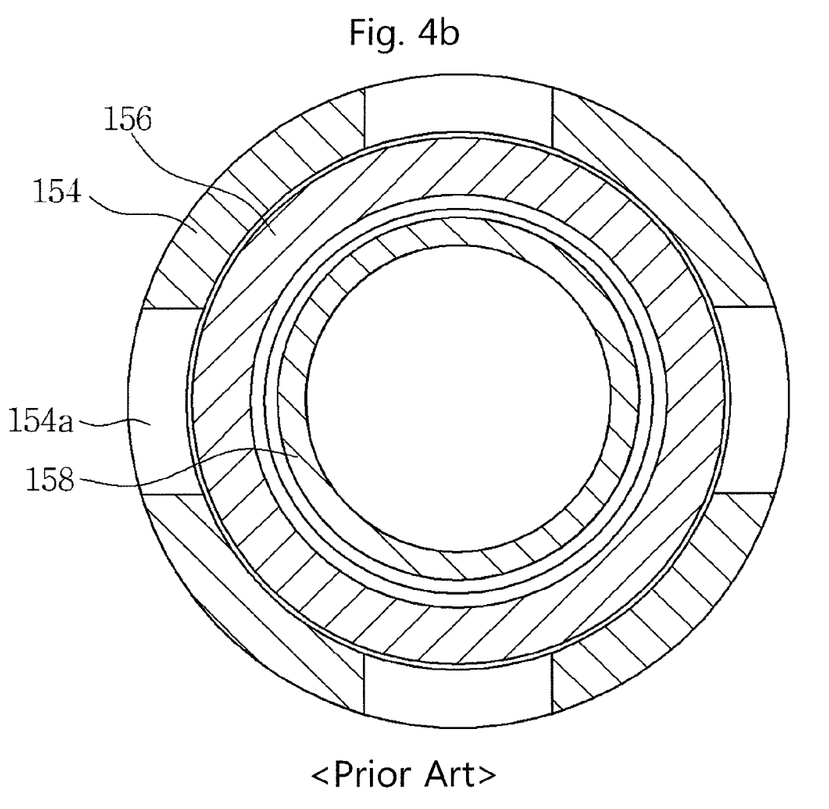

In the conventional one-way valve 150 shown in FIGS. 4A and 4B, immediately before the coolant discharging port 154a is initially opened, that is, when the pressure P of the coolant is equal to the spring force F of the resilient member, the spool valve 156 was swayed left and right due to back pressure of the coolant, thus creating a valve noise (low-frequency noise).

Figure 4C:
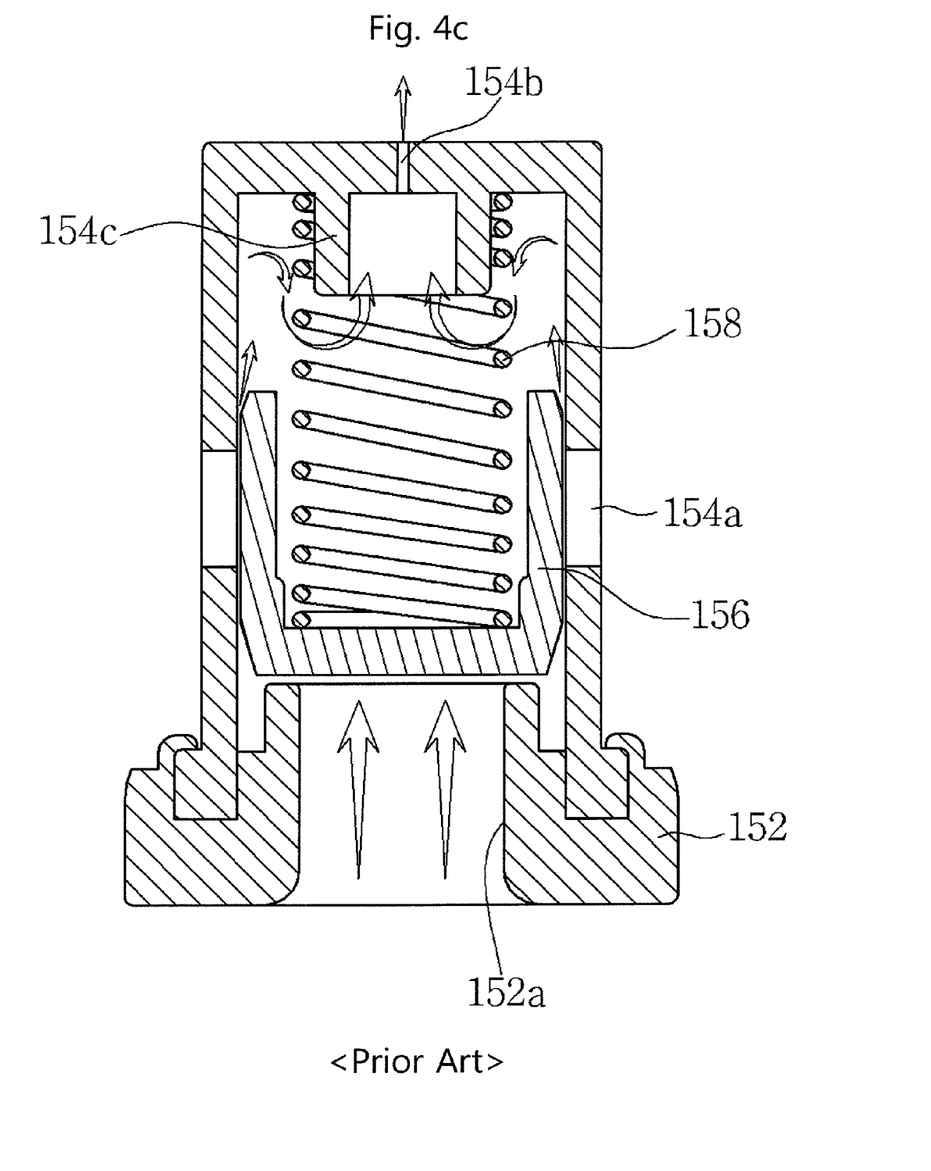

Also, as shown in FIG. 4C, the conventional one-way valve 150 has a structure in which back pressure exerted by the coolant discharging port 154a right after the coolant discharging port 154a is initially opened is difficult to release through the vent hole 154b provided at the center of the top portion. Furthermore, in the conventional one-way valve 150, a vortex flow generated while back pressure is released through the vent hole 154b caused a valve noise (high-frequency noise).

Korean Patent No. 10-0915713 (hereinafter, referred to as "Patent Document") discloses a one-way valve that may reduce a valve noise created between a valve case and a spool valve. The one-way valve includes an asymmetrically-structured coolant discharging port at the central portion of the valve case so that one end of the spool valve is brought in tight contact with the inner wall of the valve case in order to reduce a valve noise. That is, the one-way valve disclosed in Patent Document may reduce a valve noise created when the spool valve crashes against the valve case under the situation that the spring force of a resilient member is equal to the pressure of a coolant.

In the one-way valve disclosed in Patent Document, increase in pressure at the valve inlet by a coolant opens the spool valve to adjust the flow rate of the coolant. The one-way valve has been mainly used in a case where the resilient member has a spring constant of 100 gf/cm or more. If the spring constant is set to be not more than 100 gf/cm in the one-way valve, low pressure is exerted to the valve case and this incurs inflow of more coolant. Accordingly, the spool valve was easily opened even when the coolant has low pressure, and thus, a noise was created at the early stage of opening the valve. Furthermore, under the condition that the spring constant is 100 gf/cm or less, back pressure was not swiftly released through the vent hole of the valve case, and this served as another source of valve noise.

As such, the one-way valve in Patent Document could not sufficiently address the problem with the valve noise in a case where the flow rate of coolant is high or the spring constant is not more than 100 gf/cm.

Accordingly, there is a need of providing a suction valve of a variable capacity compressor for vehicle that may reduce valve noise created at the early stage of opening the spool valve even when the spring constant of the resilient member as used is 100 gf/cm or less and smoothly release back pressure to decrease valve noise.

SUMMARY

In accordance with an exemplary embodiment of the present invention, there is provided a suction valve of a variable capacity compressor for vehicle including: a valve sheet having a coolant inlet; a valve case provided over the valve sheet and having a plurality of coolant discharging ports along the circumferential surface; a spool valve selectively opening/closing the coolant inlet and the coolant discharging port in the valve case; and a resilient member provided between the valve case and the spool valve, wherein the valve case includes a first coolant discharging port on the circumferential surface with a predetermined size and a pair of second coolant discharging ports with the first coolant discharging port disposed between the pair of second coolant discharging ports, each second coolant discharging port being smaller in size than the first coolant discharging port, and wherein the spool valve includes a plurality of first grooves formed in the longitudinal direction on the circumferential surface of the spool valve and spaced from each other with a predetermined distance, and two pairs of second grooves which are formed on the first grooves so that the second grooves in each pair face each other and a coolant may be introduced from the bottom surface of the valve case, and wherein when the spool valve is initially opened, the coolant is introduced through the first and second grooves.

The first and second coolant discharging ports may be extended from the circumferential surface of the valve case to the top surface of the valve case.

The spool valve further may include a plurality of third grooves that are formed perpendicularly to the first or second grooves along the lower circumferential surface of the spool valve are spaced from each other with a predetermined distance so that the coolant may be moved in the horizontal direction.

The length of the second groove may be formed to be shorter than the length of the first groove and the third groove may be formed to be relatively shallow in depth compared to the first groove or second groove.

In the suction valve of a variable capacity compressor for vehicle according to an exemplary embodiment of the present invention, a coolant is sequentially introduced to the first groove and the second groove when the spool valve is initially opened and this prevents pressure of the coolant from being drastically transferred. Accordingly, the spool valve may be slowly opened to reduce a valve noise (low-frequency noise). Also, since the back pressure is easily released through the first and second coolant discharging ports when the spool valve is lifted up, a vortex flow may be prevented from being generated between the valve case and the spool valve, thus decreasing the valve noise (high-frequency noise).

In the suction valve of a variable capacity compressor for vehicle according to an exemplary embodiment of the present invention, further, the spring constant of the resilient member is adapted to be reduced and this may stably maintain the pressure in the valve when the valve is opened and closed by the resilient member. Thus, it may be possible to reduce occurrence of noise in the valve.

BRIEF DESCRIPTION OF THE DRAWINGS

The implementation of this document will be described in detail with reference to the following drawings in which like numerals refer to like elements.

DETAILED DESCRIPTION

Hereinafter, exemplary embodiments of the present invention will be described in greater detail with reference to accompanying drawings.

Figure 5:
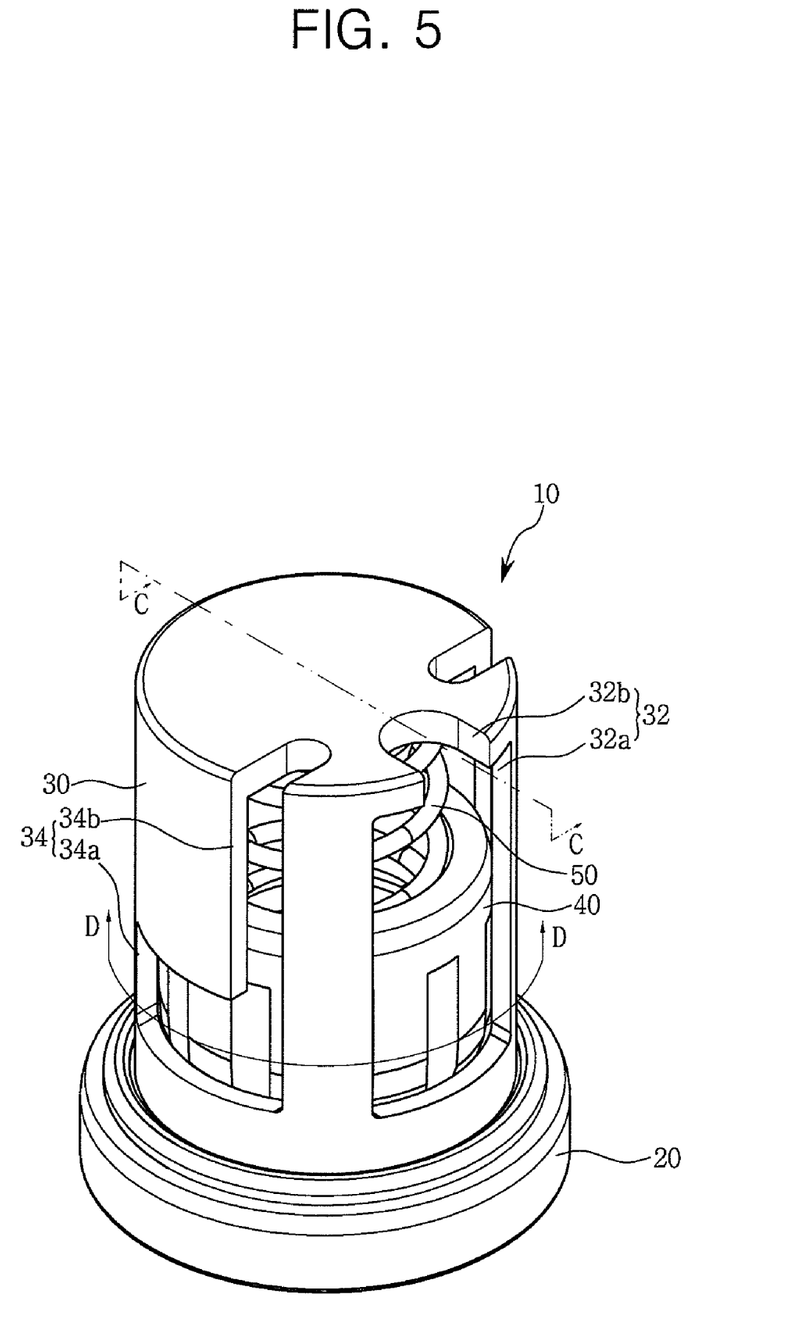
FIG. 5 is a suction valve of a variable capacity compressor for vehicle according to an exemplary embodiment of the present invention.
Figure 6A:
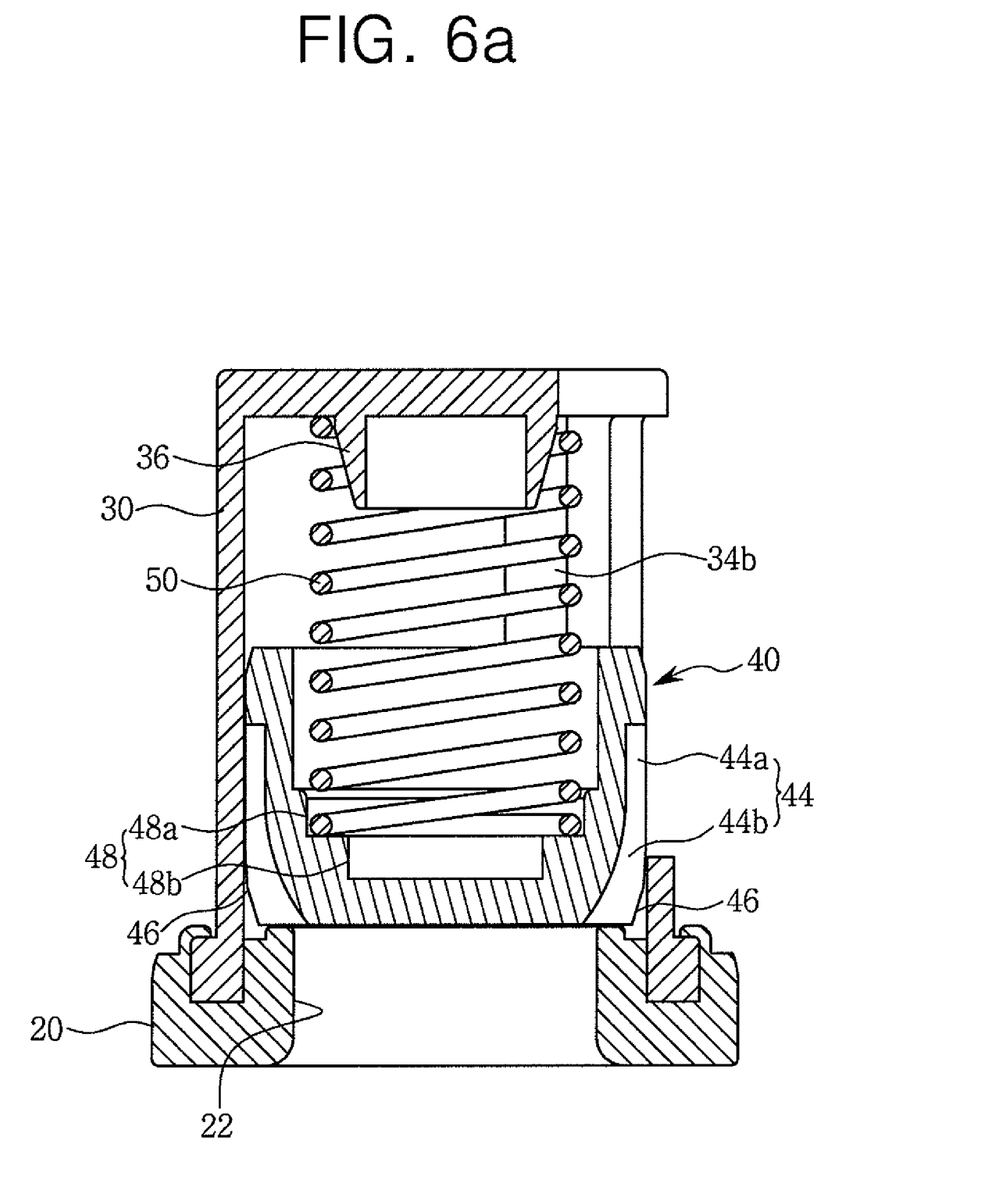
FIGS. 6A and 6B are cross section views taken along lines C-C and D-D, respectively, of FIG. 5.
Figure 6B:
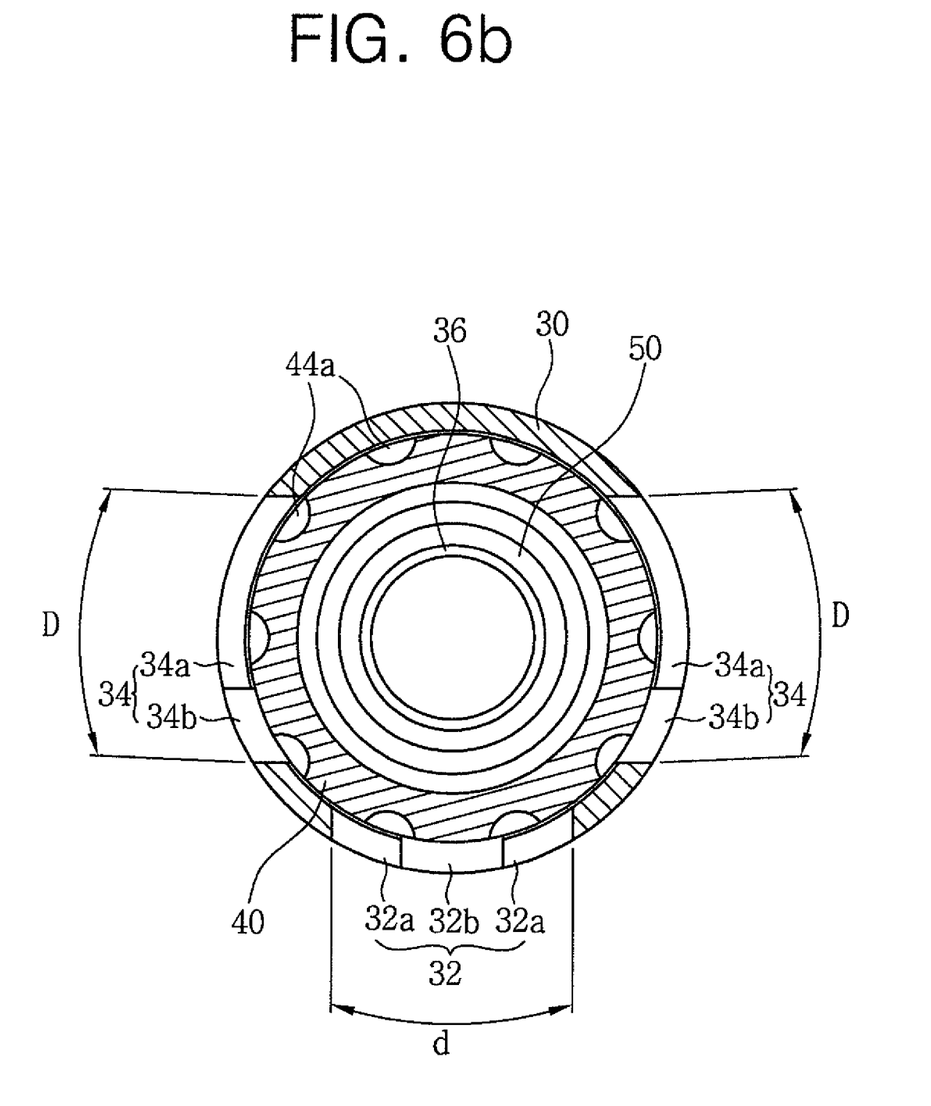

FIG. 5 is a perspective view illustrating a suction valve of a variable capacity compressor according to an exemplary embodiment of the present invention and FIGS. 6A and 6B are cross section views taken along lines C-C and D-D of FIG. 5, respectively.

As shown in FIGS. 5 and 6A, the suction valve 10 according to the exemplary embodiment of the present invention is configured so that a spool valve 40 is open by a suction force generated as a compressor (not shown) is operated to reduce the pressure in a valve case 30 and its periphery. The suction valve 10 requires more flow rate than an existing one-way valve, and thus, has a low spring constant (of 100 gf/cm or less) so as to secure a more flow rate.

As shown in FIGS. 5 and 6A, the suction valve 10 includes a valve sheet 20 having a coolant inlet 22 formed at its center; a valve case 30 provided over the valve sheet 20 and having a plurality of coolant discharging ports 32 along the circumferential surface; a spool valve 40 selectively opening/closing the coolant inlet 22 and the coolant discharging port 32 in the valve case 30; and a resilient member 50 provided between the valve case 30 and the spool valve 40.

The valve sheet 20 is provided at a discharging flow path 136 of the compressor 100 shown in FIG. 1, and includes the coolant inlet 22 therein to allow for inflow of a coolant from the compressor 100.

The valve case 30 is shaped as a cylinder whose top surface is closed, and its lower end is coupled with the upper portion of the valve sheet 20. Referring to FIG. 5, the valve case 30 has a first coolant discharging port 32 and two second coolant discharging ports 34 with the first coolant discharging port 32 disposed therebetween.

The first coolant discharging port 32 includes a main discharging port 32a formed as a rectangular opening on the circumferential surface of the valve case 30, and an auxiliary discharging port 32b extending from the center of the upper end of the main discharging port 32a to a portion of the top surface of the valve case 30 via the upper end of the valve case 30.

The second coolant discharging port 34 includes a main discharging port 34a formed as a rectangular opening on the circumferential surface of the valve case 30 and located on both sides of the main discharging port 32a of the first coolant discharging port 32 with a predetermined distance, and an auxiliary discharging port 34b extending from an end portion of the upper end of the main discharging port 34a to a portion of the top surface of the valve case 30 via the upper end of the valve case 30. Although the main discharging port 34a is shown to be rectangular in FIG. 5, the main discharging port 34 may be shaped as a triangle or a trapezoid.

The main discharging port 32a of the first coolant discharging port 32 may be sized to be relatively greater than the main discharging port 34a of the second coolant discharging port 34. However, as shown in FIG. 6B, the main discharging port 32a of the coolant discharging port 32 may have same or slightly smaller width d as/than that D of the main discharging port 32a of the second coolant discharging port 34. The auxiliary discharging port 32b of the first coolant discharging port 32 may be relatively greater in size than the auxiliary discharging port 34b of the second coolant discharging port 34.

Unlike the related art, the valve case 30 does not have a separate vent hole on its top surface. Instead, the valve case 30 includes the auxiliary discharging port 32b of the first coolant discharging port 32 and the auxiliary discharging port 34b of the second coolant discharging port 34 that are extendingly formed on the top surface of the valve case 30 to replace the vent hole of the related art.

Referring to FIG. 5, the first coolant discharging port 32 and the two second coolant discharging ports 34 are non-uniformly arranged on the circumferential surface of the valve case 30. This is why the spool valve 40 may be brought in tight contact with the inner wall surface of the valve case 30 where the first and second coolant discharging ports 32 and 34 are formed when the pressure of the coolant is equal to the spring force of the resilient member and the spool valve 40 lifts up and down, thus preventing the spool valve 40 from being swayed left and right.

As shown in FIG. 6A, a support 36 is extended downward from the center of the inner upper portion of the valve case 30. The support 36 is inserted in the resilient member 50 to support the resilient member 50 not to be swayed left and right.

Figure 7:
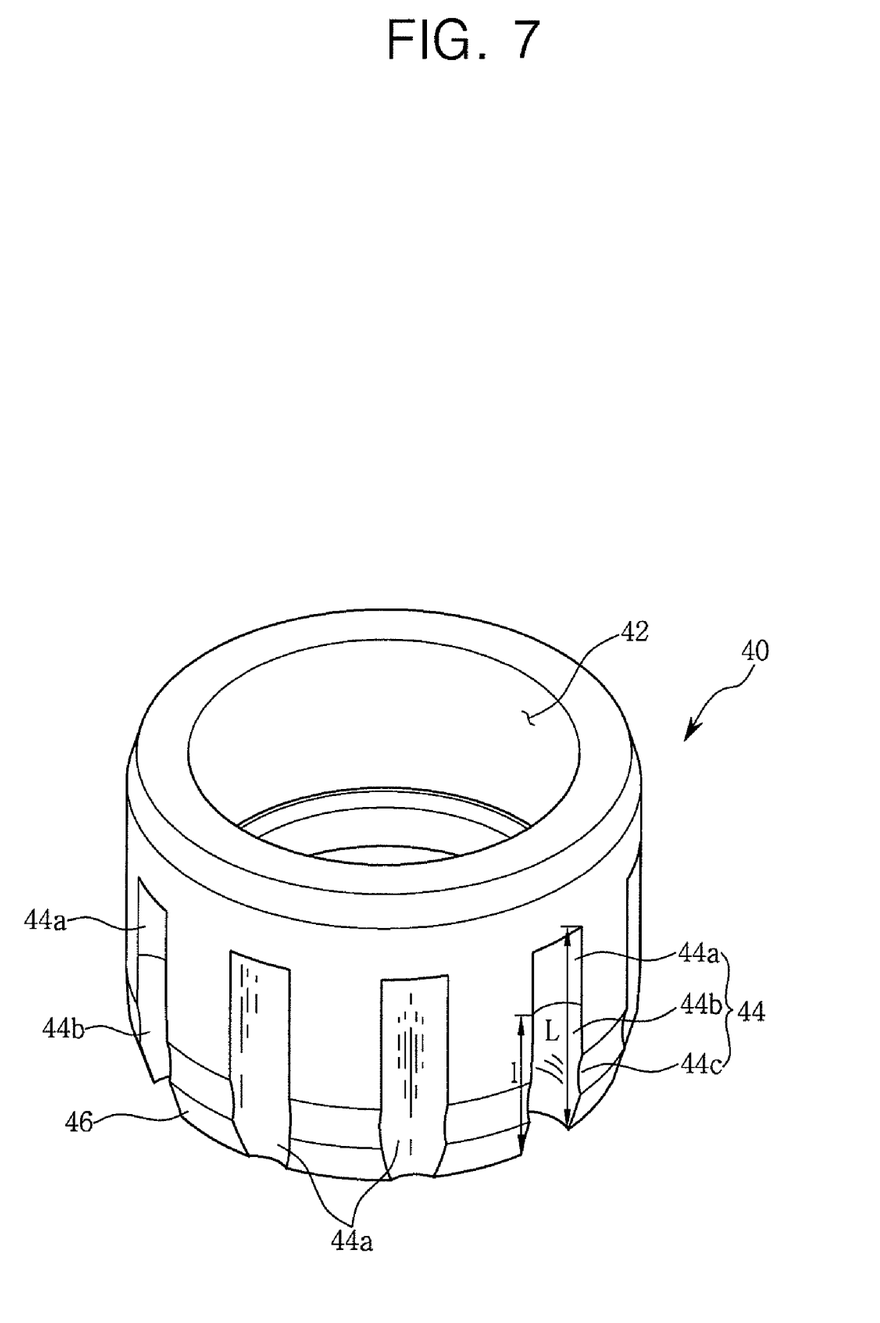
FIG. 7 is a perspective view illustrating a spool valve included in a suction valve according to an exemplary embodiment of the present invention.
Figure 8:
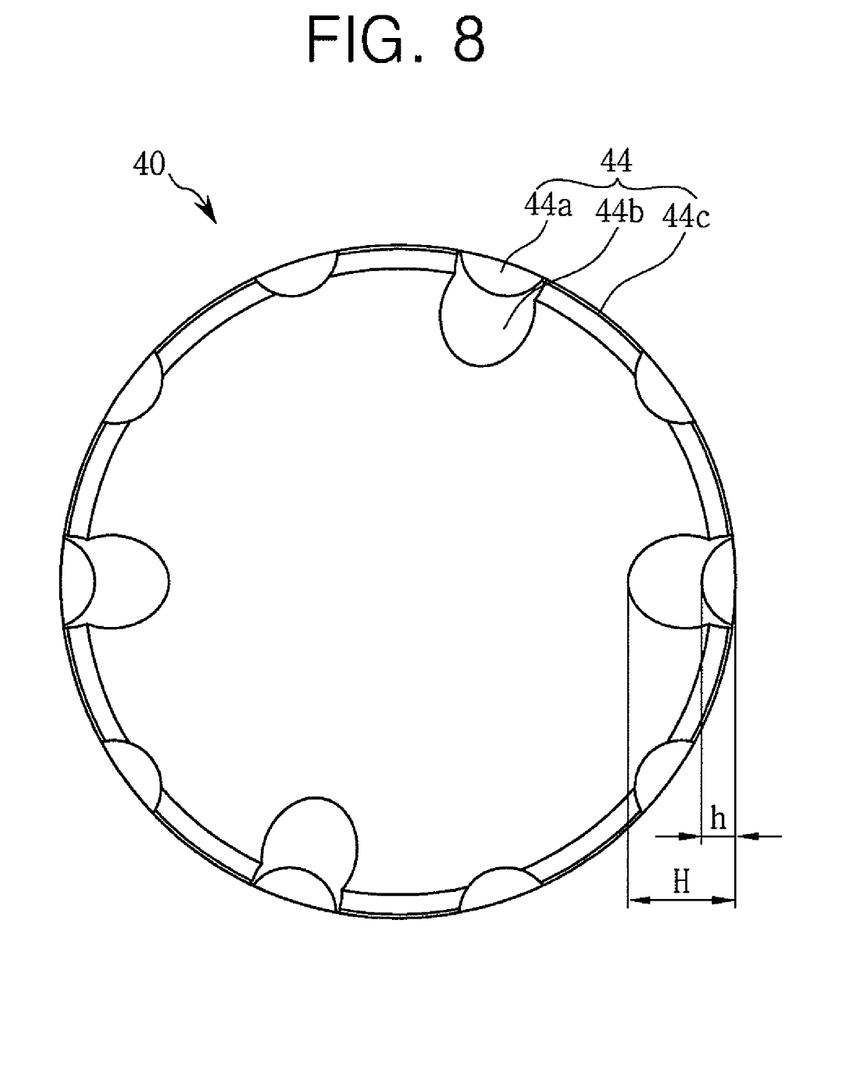
FIG. 8 is a bottom view illustrating a spool valve included in a suction valve according to an exemplary embodiment of the present invention.

Referring to FIGS. 7 and 8, the spool valve 40 includes a receiving portion 42 in which the resilient member 50 may be inserted, a plurality of grooves 44 formed on the circumferential surface in the longitudinal direction, a strip portion 46 formed along the lower circumferential surface to have a predetermined length, and a plurality of step portions 48 formed along the inner circumferential surface. The plurality of grooves 44 serves to gradually open the spool valve 40 when a coolant is introduced.

The plurality of grooves 44 may include a plurality of first grooves 44a formed in the longitudinal direction on the circumferential surface of the spool valve 40 and spaced from each other with a predetermined distance, two pairs of second grooves 44b which are formed on the first grooves 44a so that the second grooves in each pair face each other, and a plurality of third grooves 44c that are formed perpendicularly to the first or second grooves along the lower circumferential surface of the spool valve 40 and spaced from each other with a predetermined distance. And, the second grooves 44b are formed so that a coolant may be introduced from the bottom surface of the valve case 30 and the third grooves 44c are formed so that a coolant may be moved in the horizontal direction.

The length l of the second groove 44b is formed to be shorter than the length L of the first groove 44a. The depth H of the second groove 44b is formed to be larger than the depth h of the first groove 44a. As shown in FIG. 8, the second groove 44b starts from the bottom surface of the valve case 30 so that a coolant may be first introduced into the second groove 44b. Referring back to FIG. 6A, the second groove 44b is formed to be spaced from the inner wall surface of the coolant inlet 22 so that a coolant may be first introduced into the second groove 44b.

Referring to FIG. 7, the length l of the second groove 44b may be on the order of ⅔ times the length L of the first groove 44a.

The third groove 44c may be formed to be relatively shallow in depth compared to the first groove 44a or second groove 44b.

Accordingly, when the spool valve 40 is open, a coolant sequentially passes through the second grooves 44b, the first grooves 44a, and the third grooves 44c, and this may prevent pressure from being drastically transferred.

As shown in FIG. 7, the strip portion 46 is formed along the lower circumferential surface of the spool valve 40 to have a predetermined angle and a predetermined length.

The plurality of step portions 48 includes a first step portion 48a on which an end of the resilient member 50 is seated and a second step portion 48b formed between the first step portion 48a and the inner bottom surface of the spool valve 40.

The resilient member 50 is configured so that one end is supported by the support 36 of the valve case 30 and the other end is supported by the step portions 48 of the spool valve 40. The resilient member 50 returns the spool valve 40 to the original position when the pressure of coolant is released.

The operation of the spool valve of the suction valve according to the exemplary embodiment of the present invention will now be described with reference to FIGS. 6A to 9.

Under the initial condition of the spool valve 40 as shown in FIG. 6A, a coolant is introduced from the coolant inlet 22 of the valve sheet 20 through the second groove 44b and the first groove 44a of the spool valve 40. As the coolant passes through the first and second grooves 44a and 44b, the spool valve 40 is gradually opened, thus capable of reducing valve noise (low-frequency noise).

Figure 9:
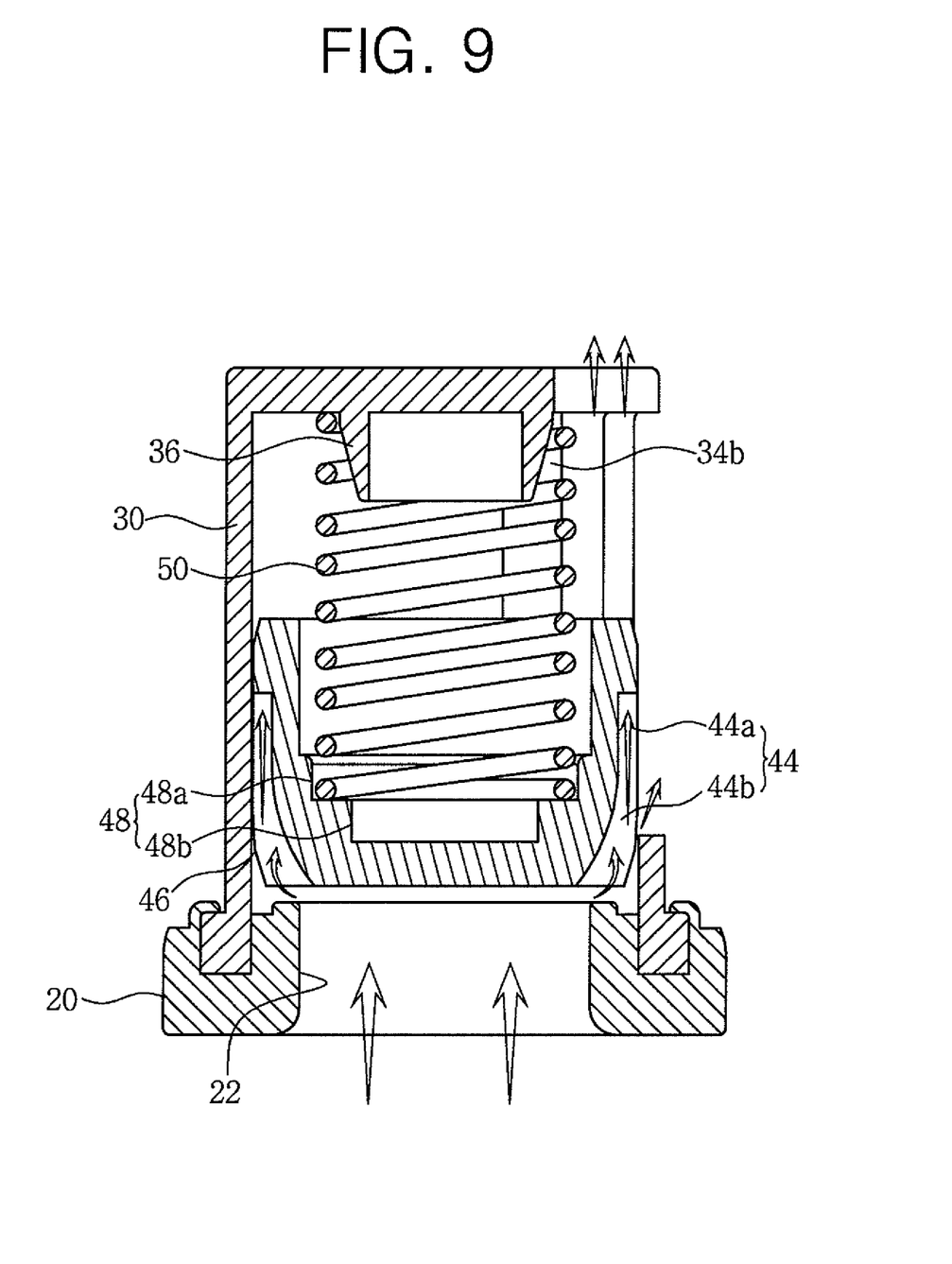
FIG. 9 is a view illustrating that a spool valve included in a suction valve according to an exemplary embodiment of the present invention is operated to release back pressure.

As shown in FIG. 9, when the spool valve 40 rises up, the back pressure is easily released through the first coolant discharging port 32 and second coolant discharging port 34 and this may prevent a vortex flow from occurring between the valve case 30 and the spool valve 40, thus reducing valve noise (high-frequency noise).

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A suction valve of a variable capacity compressor for a vehicle comprising: a valve sheet having a coolant inlet; a valve case provided over the valve sheet and having a plurality of coolant discharging ports along a circumferential surface; a spool valve selectively opening/closing the coolant inlet and the coolant discharging ports in the valve case; and a resilient member provided between the valve case and the spool valve, wherein the valve case includes a first coolant discharging port on the circumferential surface with a predetermined size and a pair of second coolant discharging ports with the first coolant discharging port disposed between the pair of second coolant discharging ports, each second coolant discharging port being smaller in size than the first coolant discharging port, and wherein the spool valve includes a plurality of first grooves formed in the longitudinal direction on the circumferential surface of the spool valve and spaced from each other with a predetermined distance, and two pairs of second grooves which are formed on the first grooves so that the second grooves in each pair face each other and a coolant may be introduced from the bottom surface of the valve case, and wherein when the spool valve is initially opened, the coolant is introduced through the first and second grooves, and wherein the first and second coolant discharging ports are extended from the circumferential surface of the valve case to the top surface of the valve case.

2. The suction valve of a variable capacity compressor for a vehicle of claim 1, wherein the spool valve further includes a plurality of third grooves that are formed perpendicularly to the first or second grooves along a lower circumferential surface of the spool valve are spaced from each other with a predetermined distance so that the coolant may be moved in the horizontal direction.

3. The suction valve of a variable capacity compressor for a vehicle of claim 2, wherein the length of the second groove is formed to be shorter than the length of the first groove and the third groove is formed to be shallower in depth compared to the first groove or second groove.

* * * * *